United States Patent [19]

Yoshida et al.

[11] 3,865,758
[45] Feb. 11, 1975

[54] POLYURETHANE FOAM FILTER MATERIAL CONTAINING ADSORBENT AND METHOD OF PRODUCTION THEREOF

[75] Inventors: Norio Yoshida; Yoshihiko Imanaka, both of Osaka; Kiyoji Katayama, Tokyo, all of Japan

[73] Assignee: Teijin Ltd., Osaka, Japan

[22] Filed: Dec. 27, 1973

[21] Appl. No.: 428,627

Related U.S. Application Data

[63] Continuation-in-part of Ser. No. 288,390, Sept. 12, 1972, abandoned.

[30] Foreign Application Priority Data

Sept. 13, 1971  Japan.................................. 46-71548

[52] U.S. Cl...... 260/2.5 AK, 210/496, 260/2.5 AD, 260/2.5 BE
[51] Int. Cl........................ C08g 22/44, C08g 51/08
[58] Field of Search... 260/2.5 AD, 2.5 AK, 2.5 BE; 210/496

[56] References Cited
UNITED STATES PATENTS

| 3,538,020 | 11/1970 | Neskett.......................... 260/2.5 AK |
| 3,549,472 | 12/1970 | King.............................. 260/2.5 AK |
| 3,607,797 | 9/1971 | Rubens........................... 260/2.5 AK |
| 3,622,526 | 11/1971 | Zorn.............................. 260/2.5 AK |
| 3,775,350 | 11/1973 | Junas............................. 260/2.5 BE |

FOREIGN PATENTS OR APPLICATIONS

| 1,212,432 | 11/1970 | Great Britain................ 260/2.5 AD |
| 1,180,316 | 2/1970 | Great Britain................ 260/2.5 AD |
| 1,031,799 | 6/1966 | Great Britain................ 260/2.5 AK |

Primary Examiner—Donald E. Czaja
Assistant Examiner—C. Warren Ivy
Attorney, Agent, or Firm—Sherman & Shalloway

[57] ABSTRACT

A method of producing polyurethane foam filter material containing an activated carbon adsorbent which comprises reacting a polyurethane foam-forming composition comprising isocyanates and polyesters or polyethers in the presence of particles of an activated carbon adsorbent, a small amount of water and a catalyst, characterized in that the particles of the activated carbon adsorbent are pre-coated on their surfaces with a film-forming polymeric material which does not substantially react with the polyurethane foam-producing components, does not dissolve the polyurethane foam and can be removed, after formation of the polyurethane foam, by application of solvent. The filter material obtained finds a wide range of utility such as for water cleansing, ion-exchanging, deodorizing or drying purposes.

2 Claims, 1 Drawing Figure

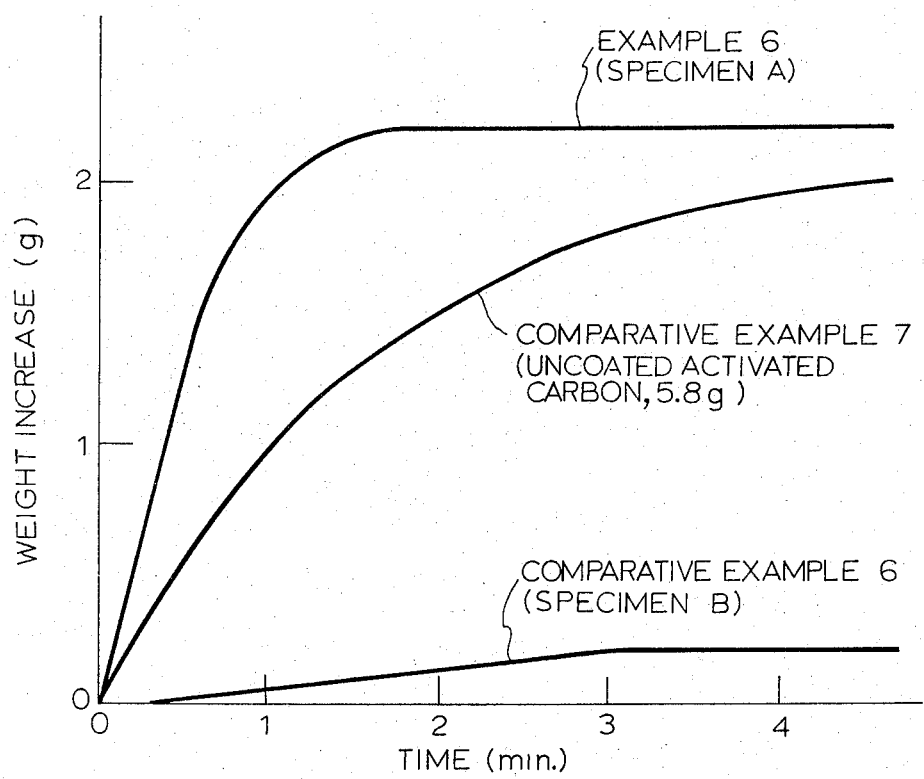

POLYURETHANE FOAM FILTER MATERIAL CONTAINING ADSORBENT AND METHOD OF PRODUCTION THEREOF

This application is a continuation-in-part of application Ser. No. 288,390 filed Sept. 12, 1972, now abandoned.

This invention relates to an improved method of producing a polyurethane foam filter material containing activated carbon adsorbents. Especially, it relates to an improved method of producing a polyurethane foam filter material of good adsorption without unfavorable side reactions and with easy control of the reaction operation.

It has been known previously that a polyurethane foam having adsorbability which can be used to filter a gaseous or liquid material is produced by reacting a polyurethane foam-producing composition comprising isocyanates and polyesters or polyethers in the presence of the particles of an adsorbent, a small amount of water and a catalyst. For example, French Pat. No. 1,248,233 discloses a method of producing a polyurethane foam filter material having adsorbability and containing an ion-exchange resin by adding the particles of an ion-exchange resin to a mixture of a polyether and a polyisocyanate, and reacting the resulting mixture under conditions such as to form a polyether-type polyurethane foam. Furthermore, Japanese Pat. Publication No. 3793/67 discloses a method of producing a polyurethane foam filter material having adsorbability by reacting a compound having two or more active hydrogen atoms such as a polyether-polyol or polyester-polyol with a polyisocyanate in the presence of a blowing agent and an adsorbent.

In these prior art methods, the selection of the time of addition of adsorbent is complicated and difficult because the addition has adverse affects on the reaction of polyurethane-foam formation by its adsorbency for the catalyst, water, isocyanates, etc. Failure to select the right time of addition of the adsorbent may result in hampering the progess of the reaction of forming a polyurethane foam or result in a product of poor quality. Furthermore, attempts to select the right time for the addition is complicated and requires the utmost care in accordance with which the prior art methods fail for practical purposes to produce a polyurethane foam filter material having adsorbability of good constant quality in a steady state process.

Since the adsorbent directly affects the reaction of forming a polyurethane foam, it is undesirable to incorporate the adsorbent in an amount such as to hamper the desired foam production. The amount of the adsorbent that can be incorporated in the prior methods is at most about 15 % by weight, depending upon the type of the adsorbent or the type of the polyurethane foam-producing components, and the provision of a filter material having a high degree of adsorbability cannot be expected.

It has now been found that the defects of the prior art methods can be eliminated by using particles of an activated carbon pre-coated with a film-forming polymeric material which does not substantially react with the polyurethane foam-producing components, does not dissolve the resulting polyurethane foam, and can be removed from the polyurethane foam by application of a solvent. Filter material of excellent quality can be produced according to the present invention with good reproducibility of quality and with ease of operation. As a result, an increased amount of an activated carbon adsorbent in its active form can be incorporated into a polyurethane foam, and one can therefore obtain a polyurethane foam filter material having improved adsorbability.

Accordingly, it is an object of this invention to provide a method of producing a polyurethane foam filter material having adsorbability, which can obviate the various disadvantages of the prior art methods.

Another object of this invention is to provide a filter material having a high degree of adsorbability into which a large amount of an activated carbon adsorbent is incorporated.

Other objects and advantages of the present invention will become clearer from the following detailed description and the single FIGURE which represents the results of Example 6 and Comparative Examples 6 and 7.

According to the present invention, there is provided a method of producing a polyurethane foam filter material having adsorbability which comprises reacting a polyurethane foam-forming composition comprising isocyanates and polyesters or polyethers in the presence of particles of an activated carbon adsorbent, a small amount of water and a catalyst, the improvement comprising (a) carrying out the reaction in the presence of pre-coated particles of the activated carbon coated with a film-forming polymeric material which does not dissolve the polyurethane foam and can be removed after formation of the polyurethane foam by application of solvent, wherein the amount of the polymeric material is in the range of 1 to 10 % by weight of said adsorbent, and the amount of the adsorbent particles is at least 2 % by weight based on the weight of the polyurethane formed, and (b) removing the coated film-forming polymeric material from the formed polyurethane by the application of solvent.

The particle size of the activated carbon adsorbent can be varied over a wide range, but usually, a particle size in the range of about 20 to 200 mesh are frequently used. The amount of the activated carbon adsorbent is not particularly limited, but preferably should be at least 2 % by weight based on the weight of the polyurethane formed. The adsorbability of the polyurethane foam increases with increasing amount of the activated carbon adsorbent to be incorporated, and the present invention has made it possible to incorporate a far larger amount of the activated carbon adsorbent, which has hitherto been impossible. If desired, it is possible to incorporate the activated carbon adsorbent in an amount as large as about 500 % by weight. Thus, the present invention provides a polyurethane foam filter material having incorporated therein the activated carbon adsorbent in an amount exceeding about 15 % by weight which is the upper limit in the prior art methods. The filter material obtained by the method of this invention preferably contains at least 25 % by weight, more preferably at least 40 % by weight, and especially preferably at least 50 % by weight and up to about 400 % by weight, of the activated carbon in its active form based on the weight of the polyurethane foam.

The film-forming polymeric material to be pre-coated on the surfaces of the activated carbon adsorbent particles prevent the direct contact of the activated carbon adsorbent and the reaction mixture during the formation of the polyurethane foam, and after formation of the polyurethane foam, can be removed therefrom to cause the activated carbon adsorbent to exhibit its inherent adsorbing ability fully.

The film-forming polymeric material used in the present invention may be natural or synthetic or artificial film-forming polymeric materials. Naturally, there are excluded those materials which can be removed only by using a solvent which substantially dissolves the resulting polyurethane foam.

Specific examples of the film-forming polymeric material include natural water-soluble polymeric materials such as starch, gelatin, sodium alginate, tragacanth gum, or locust bean gum; natural low-melting film-forming polymeric materials which melt and liquefy at low temperatures such as wooden wax (also referred to as Japan tallow or Japan wax), pine tar or paraffin; synthetic or artificial film-forming polymeric materials soluble in a solvent such as water, acetone or dioxane, such as methyl cellulose, ethyl cellulose, carboxymethyl cellulose, hydroxyethyl cellulose or cellulose acetate; synthetic film-forming polymeric materials soluble in a solvent such as water, ethylene dichloride or acetone, such as polyalkylene oxides, e.g. polyethylene oxide; snythetic film-forming polymeric materials soluble in a solvent such as water, lower alcohols, acetone, ethylene dichloride, benzene, toluene or methyl ethyl ketone, such as polystyrene, polyvinyl alcohol, polyvinyl methyl ether, polyalkylacrylates (alkyl containing 1 to 4 carbon atoms); and other synthetic resins soluble in water or an organic solvent (which does not substantially dissolve the resulting polyurethane foam).

The formation of the coated film on the surfaces of the particles of the activated carbon adsorbent can be performed by various known means. The most typical means involves dissolving the film-forming polymeric material in water or an organic solvent, mixing the solution with the particles of the activated carbon adsorbent by a suitable method such as immersion or spraying, and then evaporating off the from the polymeric material coated on the activated carbon adsorbent particles thereby to form coatings. It is also possible to melt the polymeric material by heat, and mix it with the particles of the activated carbon adsorbent.

The amount of the film-forming polymeric material may be chosen so as to prevent contact of the surface of the particles of the activated carbon adsorbent with the reactants during the formation of the polyurethane foam, and may vary depending upon such factors as the type of the polymeric material. Generally, the amount of the polymeric material is at least about 1 % by weight of the amount of the activated carbon adsorbent. The polymeric material may be used in large quantities, but it is not necessary to use too much since it takes time to remove the material after formation of the polyurethane foam. Preferably, the amount of the film-forming polymeric material is 1 to 10 % by weight of the weight of the activated carbon adsorbent.

Where the film-forming polymeric material is used in the form of a solution, it is preferred that the viscosity of the solution should be such as to form a film only on the surfaces of the activated carbon adsorbent particles. Therefore, the viscosity of the solution should not be made extremely low. On the other hand, a solution of an excessively high viscosity makes it difficult to apply the coating solution uniformly on the surfaces of the activated carbon adsorbent particles, and the use of such solution should be avoided. The viscosity of the solution is usually about 1,000 cp – 30,000 cp; although it may vary according to the type of the film-forming polymeric material, or the coating method, etc.

According to the method of this invention, the complicated and meticulous cares and the many restrictions, which are required for determining the time of the addition of the adsorbent by the conventional methods, can be obviated, and the time of addition can be freely preset. Some film-forming polymeric materials contain in their chemical structure hydrogen atoms which are active toward isocyanates. Even if such a material is used, the isocyanates preferably react only with polyesters or polyethers, and do not substantially react with the coatings during the formation of polyurethane foam, because the coatings form a solid film, which is, of course, a much less reactive state, on the surfaces of the adsorbent particles; i.e. the film-forming polymeric material does not substantially react with the polyurethane foam-forming components.

Not only is it possible according to the present invention to add the activated carbon adsorbent particles coated with the film-forming polymeric material at any desired time, but also the invention has the additional advantage that a polyurethane foam filter material having remarkably improved adsorbability and containing a far larger amount of activated carbon adsorbent than obtainable by the conventional methods can be obtained.

The components forming polyurethane foams and suitable reaction techniques are well known and are reported in many publications, for example, in the prior patents mentioned above.

Examples of these components forming polyurethane foams include polyesters made from acid selected from the group consisting of succinic acid, glutanic acid, adipic acid, suberic acid, azelaic acid, sebacic acid, phthalic acid, iso-phthalic acid, dodecanedicarboxylic acid, and a glycol selected from the group of ethylene glycol, 1,2-propylene glycol, 1,3-propylene glycol, 1,3-butylene glycol, tetramethylene glycol, diethylene glycol, triethylene glycol, pentamethylene glycol, hexamethylene glycol, xylylene glycol; polyethers such as poly(oxypropylene) glycols, poly(oxypropylene)-poly(oxyethylene) copolymer glycols, poly(oxybutylene)glycols, poly(oxyethylene)glycols, poly(oxytetramethylene)glycols, poly(oxypropylene)glycerols, poly(oxypropylene) trimethylolpropanes, poly(oxypropylene)-1,2,6-hexanetriols, poly(ethyleneoxide propyleneoxide ethylenediamine)polyethers, poly (oxyalkylene)sorbitols, poly(oxyalkylene)pentaerythritols, poly (oxyalkylene)sucrose, and poly(oxyalkylene)glucose; and isocyanates such as tolylene diisocyanate, 3,3-bitolylene-4,4'-diisocyanate, diphenyl methane-4,4'-diisocyanate, 3,3'-dimethyl diphenyl methane-4,4'-diisocyanate, 2,4-tolylene diisocyanate dimer, 1,5-naphtylene diisocyanate, m-phenylene diisocyanate, triphenylmethane-4,4',4''-triisocyanate, and hexamethylene diisocyanate.

The reaction can be performed by various means, and the most frequently used means includes mixing the polyethers or polyesters with the particles of the activated carbon adsorbent whose surfaces are pre-coated with the film-forming polymeric material, adding the isocyanates to the resulting mixture in the presence of a small amount of water and a catalyst, and stirring the mixture. If desired, the reaction may be carried out in the copresence of known fillers for foaming. Examples of the fillers include mica powder, polyvinyl chloride powder, fibers, asbestos, etc.

The pre-coating of the film-forming polymeric material applied to the surface of the activated carbon adsorbent can be removed after the formation of the polyurethane by extracting the polyurethane foam with a solvent which dissolves the polymeric material and does not substantially dissolve the polyurethane foam itself. In order to dissolve the polymeric material easily, a solvent which does not substantially dissolve the polyurethane foam but swells it can also be utilized. After the removal of the film-forming polymeric material by dissolving, the solvent that might still be contained in the polyurethane foam is removed if desired, and the polyurethane foam is dried. The removal of the solvent may be omitted when, for example, water is used as the solvent. The removal of the solvent can be accomplished by washing, volatilization or other suitable means. If desired, the polyurethane foam may be dried by heating under reduced pressure.

In the present invention, preferred solvents are those which do not substantially dissolve the resulting polyurethane foam but can dissolve the polymeric materials easily, and which are low in cost and readily available. For example, for the removal of the natural water-soluble film-forming polymeric materials, the use of water, if desired hot water, is preferred. For the cellulose derivatives, the use of water, acetone or dioxane is preferred. A polyalkylene oxide having a molecular weight of not more than 4,000,000, for example, from 300,000 to 500,000 is one example of the preferred polymeric materials, for which the use of water, acetone or ethylene dichloride is preferred. When a vinyl-type polymer is used as the polymeric material, a suitable solvent may be selected, according to the type of polymer, from benzene, toluene, carbon tetrachloride, lower alcohols, ethylene dichloride, ligroin, methyl ethyl ketone and water.

Especially preferred combinations of the film-forming polymeric material and the solvent for removing the film of the material are exemplified as follows:

Gelatin — water; methyl cellulose — water; polyethylene oxide — water, ethylene dichloride or acetone; polystyrene — ethylene dichloride, benzene, toluene, or methyl ethyl ketone; and polyalkyl ($C_{1-4}$ alkyl) acrylate — water.

It is preferred that after removal of the film-forming polymeric material, the polyurethane foam is heated under reduced pressure, for example, from 100 mm Hg to $10^{-2}$ mm Hg, at a temperature below the melting point of the polyurethane foam, preferably below 150°C., for example, from 150°C. to 50°C., whereby substances that are adsorbed by the activated carbon adsorbent particles during the production of the polyurethane foam are evaporated off to increase the adsorptive activity of the filter material obtained.

The polyurethane foam filter material so produced has an adsorbing action based on the activated carbon adsorbent in addition to a mechanical filtering effect based on the urethane foam, and finds wide utility in the cleansing of air or water, ion-exchange, deodorization, drying, sterilization, prevention of public hazards, or separation and purification, for example.

The invention will be described further by the following Examples and Comparative Examples.

EXAMPLE 1 AND COMPARATIVE EXAMPLES 1 AND 2

100 g of activated carbon made of coconut shell having a particle size of 30 – 50 mesh (Kintal, tradename of the product of Daiichi Tanso, Japan) was mixed with a solution of 3 g of polystyrene (Esbright LBL, tradename for the product of Showa Denko Kabushiki Kaisha, Japan) in 27 g of methyl ethyl ketone, and the mixture was maintained at room temperature at 20 mm Hg for 1 hour with slow stirring. The polystyrene coated activated carbon was mixed with 100 g of poly(oxypropylene) adducts of glycerin having a molecular weight of about 3000, followed by addition of 2.0 g of poly(dimethyl)siloxane silicone oil (viscosity at 25°C.: 1200 – 1500 antistokes) and 0.35 g of tin octylate. Separately, a solution of 0.1 g of triethylene diamine in 4.2 g of water was prepared, and 14.0 g of monofluorotrichloromethane and 51.9 g of tolylene diisocyanate were added simultaneously to the polyether solution, followed by stirring for 7 seconds at a speed of 1000 r.p.m. The mixture immediately began to expand, and was swelled to 3.5 liters and solidified.

Twenty-four hours later the foamed product was cut into a thickness of 1 cm, and extracted 20 times by benzene in a large-sized Soxhlet extractor, followed by drying. The resultant specimen was designated (A). The foamed product not extracted with benzene was designated specimen (B) [Comparative Example 1].

Drinking water having a residual chlorine concentration of 1.5 ppm was passed through 50 g of each of the Specimens (A) and (B) at a rate of 4 liters per minutes, respectively. The breakthrough point i.e., the point at which the adsorbent is saturated with adsorptive and shows no more adsorption, was 2107 liters for (A), and 791 liters for (B).

100 liters of drinking water having a residual chlorine concentration of 1.5 ppm was circulated through 50 g of each of the specimens (A) and (B) at a rate of 4 liters per minute for 1 hours. The residual chlorine concentration of the water was 0 for (A), and 0.3 ppm for (B).

For comparison, the above procedure was repeated except that the coating of the activated carbon with polystyrene was omitted [Comparative Example 2]. As a result, the activated carbon completely hampered the progress of the reaction of forming a polyurethane foam, and it was impossible to obtain it.

EXAMPLE 2 AND COMPARATIVE EXAMPLE 3

100 g of activated carbon made of coconut shell having a particle size of 30 to 50 mesh was mixed with a solution of 3 g of gelatin dissolved in 57 g of water. With slow stirring at 100°C., water was removed by evaporation, and in the same way as set forth in Example 1, a polyurethane foam containing activated carbon was produced. A sample having a size of 1 cm × 5 cm × 5 cm was cut out from this product, and extracted 40 times by hot water in a Soxhlet extractor. The extracted product was dried for 8 hours at 105°C. under 1 mm Hg. The dried product was designated Specimen (E). The product not extracted with water was designated Specimen (F) [Comparative Example 3]. Each of the Specimens (E) and (F) was placed in a 500 ml. flask equipped with a ground glass stopcock, and maintained for 10 hours therein while the pressure was constantly maintained at 1 atmosphere using $SO_2$ gas. An increase in the weight of the Specimens was measured. It was found Specimen (E) showed a weight increase of 4.6 %, and Speciment (F), 2.0 %.

EXAMPLE 3

100 parts of activated carbon made of coconut shell having a particle size of 30 – 50 mesh was coated with 3 parts of each of the polymers shown in Table 1, and the coated activated carbon was mixed with various amounts (30 to 100 %) of the polyurethane foam in the same way as set forth in Example 1. The upper limit of the amount of the activated carbon for forming good polyurethane foam was measured, and shown in Table 1.

The upper limit of the amount of activated carbon having 30 – 50 mesh not coated with a polymer is about 15 %. It is therefore clear that the coating of the polymer on the adsorbent makes it possible to prevent the adsorbent from adversely affecting the progress of forming a polyurethane foam, and according to the present invention, the adsorbent can be incorporated in an amount which has hitherto been impossible in the prior art methods.

Table 1

| Polymers | Coating Solvent | Maximum Amount of Activated Carbon (% by weight based on the weight of the polyurethane foam component) |
| --- | --- | --- |
| Tragacanth gum | Water | 70 |
| Gelatin | do. | 88 |
| Gum arabic | do. | 70 |
| Sodium alginate | do. | 75 |
| Locust bean gum | do. | 60 |
| Methyl cellulose | do. | 79 |
| Ethyl cellulose | do. | 69 |
| Carboxymethyl cellulose | do. | 60 |
| Carboxylethyl cellulose | do. | 75 |
| Cellulose acetate | Acetone | 95 |
| Polyethylene oxide | Ethylene dichloride | more than 100 |
| Polystyrene | do. | more than 100 |
| Polyvinyl alcohol | Water | 70 |
| Polyvinyl methyl ether | do. | 78 |
| Polyalkyl acrylate | do. | 79 |

A polyurethane foam filter material containing activated carbon and having excellent adsorbability was obtained by removing the coated polymers in the same manner as in Example 1 by using the same coating solvents as those used for each sample of Table 1.

EXAMPLE 4 AND COMPARATIVE EXAMPLE 4

5.0 Grams of specimens A and B (Comparative Example 4) prepared according to Example 1 were put into two 1-liter flasks each containing 0.1 PPM of iso- valeric acid vapour, and were kept for 1.5 hours at room temperature. Then six 50-ml gas samples were taken out from each flask by a hypodermic syringe. A smell test was conducted by a panel of 6 members, so that each member may try each of gas samples from the two flasks (i.e., try two samples). Results were as shown below.

| Judgment of Smell | A | B |
| --- | --- | --- |
| None | 6 | 0 |
| Perceptible | 0 | 0 |
| Recognizable | 0 | 0 |
| Moderate | 0 | 0 |
| Strong | 0 | 0 |
| Very strong | 0 | 6 |

Numerals represent number of persons voted.

EXAMPLE 5 AND COMPARATIVE EXAMPLE 5

0.6 Gram of specimen A prepared according to Example 1 was put into 300 ml of water containing 80 PPM of p-xylene and and then stirred slowly. After having stirred for 1 hour, the amount of residual p-xylene in the solution was determined by the gas chromatography and calculated to be 20 PPM. The same procedure was carried out for the specimen B (Comparative Example 5) and a value of 60 PPM was obtained. Therefore, the decrease of 40 PPM might have been caused by the removal of polystyrene from the surfaces of the activated carbon in the specimen B.

EXAMPLE 6 AND COMPARATIVE EXAMPLES 6 AND 7

FIG. 1 shows weight increase of the specimens and activated carbon exposed to the air saturated with chloroform at room temperature. Exposure was carried out by passing the chloroform-saturated air at a rate of 10 liters per minute to an area of 100 $cm^2$. Hence the linear velocity of the passing was 100 cm per minute.

Specimen A and specimen B (Comparative Example 6) were obtained according to Example 1, their size being 10 × 10 × 2 cm and weighing about 13.4 g, respectively.

For the purpose of comparison (Comparative Example 7), the activated carbon was held between two plates (10 × 10 cm) made of a 100-mesh stainless steel net. The amount of the uncoated activated carbon used was 5.8 g, just being equal to the amount contained in the specimens A and B.

From the results of FIG. 1, it could be understood that by removing a coated film-forming polymeric material from the polyurethane foam formed, it is possible to obtain a material having far superior adsorbability compared to the case of not removing the coated film forming polymeric material and unexpected effects superior to the active carbon itself is exhibited.

What is claimed is:

1. In a method of producing a polyurethane foam filter material containing activated carbon which comprises reacting a polyurethane foam-forming composition comprising a isocyanate and a polyester or a polyether in the presence of particles of activated carbon, a small amount of water, and a catalyst;

the improvement comprising (a) carrying out the reaction in the presence of pre-coated particles of the activated carbon coated with a solid film of a film-forming polymeric material selected from the group consisting of starch, gelatin, sodium alginate, tragacanth gum, locust bean gum, methyl cellulose, ethyl cellulose, carboxymethyl cellulose, hydroxyethyl cellulose, cellulose acetate, polyalkylene oxides, polystyrene, polyvinyl alcohol, polyvinyl methyl ether and polyalkylacrylates, which coating does not dissolve the polyurethane foam and can be removed after formation of the polyurethane foam by application of solvent, wherein the amount of the polymeric material is in the range of 1 to 10 % by weight of said adsorbent, and the amount of the adsorbent particles is at least 2 % by weight based on the weight of the polyurethane formed, and (b) removing the coated film-forming polymeric material from the formed polyurethane by the application of solvent which dissolves the polymeric material and does not substantially dissolve the polyurethane foam.

2. The method of claim 1 wherein the amount of the activated carbon is 25 % to 400 % by weight based on the weight of the polyurethane formed.

* * * * *